United States Patent
Tabata et al.

(10) Patent No.: US 12,472,931 B2
(45) Date of Patent: Nov. 18, 2025

(54) CONTROLLER AND CONTROL METHOD FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Masato Nakano, Toyota (JP); Nobuhiko Satake, Toyota (JP); Yoshito Sekiguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 18/450,876

(22) Filed: Aug. 16, 2023

(65) Prior Publication Data
US 2024/0067158 A1 Feb. 29, 2024

(30) Foreign Application Priority Data

Aug. 24, 2022 (JP) ................. 2022-133600

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01); *B60W 10/10* (2013.01);
(Continued)

(58) Field of Classification Search
CPC .................................................. B60W 20/15
See application file for complete search history.

(56) References Cited

U.S. PATENT DOCUMENTS

| 11,808,224 | B2* | 11/2023 | Sakagami | .......... F01M 13/0011 |
| 2017/0009684 | A1 | 1/2017 | Kawamura et al. | |
| 2024/0067158 | A1* | 2/2024 | Tabata | .................. B60W 20/15 |

FOREIGN PATENT DOCUMENTS

FR     3 049 311 A3     9/2017
JP     2008-297984 A1   12/2008
(Continued)

OTHER PUBLICATIONS

"Shell Lexikon Verbrennungsmotor," ATZ, Springer Vieweg, DE, vol. 97, No. 7/08, Jul. 1, 1995, pp. 1-8.

*Primary Examiner* — Michael A Berns
(74) *Attorney, Agent, or Firm* — Finnegan, Henderson, Farabow, Garrett and Dunner LLP

(57) ABSTRACT

A vehicle including an internal combustion engine and an automatic transmission capable of transmitting and receiving torque to and from an output shaft of the internal combustion engine is controlled. During operation of the internal combustion engine, a process that calculates a diluted water amount based on an operation state of the internal combustion engine is executed. The diluted water amount is the amount of water contained in lubricating oil in the internal combustion engine. Further, a process that controls the automatic transmission such that torque per unit period in the internal combustion engine becomes smaller when the diluted water amount is relatively large compared to when the diluted water amount is relatively small, while continuing the operation of the internal combustion engine, is executed.

11 Claims, 4 Drawing Sheets

(51) Int. Cl.
*B60W 10/08* (2006.01)
*B60W 10/10* (2012.01)
*B60W 20/13* (2016.01)
*B60W 50/02* (2012.01)
*B60W 50/038* (2012.01)
*F01M 11/10* (2006.01)
*F02D 41/22* (2006.01)

(52) U.S. Cl.
CPC ........ *B60W 20/13* (2016.01); *B60W 50/0205* (2013.01); *B60W 50/038* (2013.01); *F01M 11/10* (2013.01); *F02D 41/22* (2013.01); *B60W 2510/244* (2013.01); *F01M 2011/14* (2013.01); *F01M 2250/00* (2013.01)

(56) References Cited

FOREIGN PATENT DOCUMENTS

| | | | |
|---|---|---|---|
| JP | 2015-168379 A | | 9/2015 |
| JP | 2017-013728 A | | 1/2017 |
| JP | 2017081447 A | * | 5/2017 |

* cited by examiner

CONTROLLER AND CONTROL METHOD FOR VEHICLE

BACKGROUND

1. Field

The present disclosure relates to a controller and a control method for a vehicle.

2. Description of Related Art

Japanese Laid-Open Patent Publication No. 2017-081447 discloses a vehicle including an internal combustion engine, a first motor generator that drives the internal combustion engine, and a second motor generator used for traveling. The internal combustion engine includes a crank chamber accommodating a crankshaft, an intake passage having a throttle valve, and a blow-by gas recovery passage. The recovery passage connects between the crank chamber and a portion of the intake passage that is located downstream of the throttle valve.

In the internal combustion engine, some of the water generated by the combustion of fuel enters the crank chamber from a cylinder. The water is mixed with the lubricating oil accumulated at the bottom of the crank chamber. Thus, when the amount of water mixed in the lubricating oil increases, a controller for the vehicle stops the combustion of fuel in the internal combustion engine. Then, the controller uses the first motor generator to rotate the crankshaft with the throttle valve closed. As a result, the pressure in the recovery passage becomes negative relative to the atmospheric pressure. The negative pressure promotes evaporation of the water mixed in the lubricating oil, and causes the evaporated water to flow back to the intake passage.

As in the technique disclosed in Japanese Laid-Open Patent Publication No. 2017-081447, when the internal combustion engine is stopped to reduce the amount of the water mixed in the lubricating oil, the following problem occurs. In Japanese Laid-Open Patent Publication No. 2017-081447, a drive force requested by the vehicle is provided only by the second motor generator during rotation of the crankshaft by the first motor generator. However, for example, when the state of charge of the battery is insufficient, the drive force requested by the vehicle may be unable to be fully provided by only the second motor generator.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

One aspect of the present disclosure provides a controller for a vehicle. The vehicle includes an internal combustion engine and a torque application device capable of transmitting and receiving torque to and from an output shaft of the internal combustion engine. The controller includes processing circuitry. During operation of the internal combustion engine, the processing circuitry is configured to execute a water amount calculation process that calculates a diluted water amount based on an operation state of the internal combustion engine, the diluted water amount being an amount of water contained in lubricating oil in the internal combustion engine, and a specific process that controls the torque application device such that torque per unit period in the internal combustion engine becomes smaller when the diluted water amount is relatively large compared to when the diluted water amount is relatively small, while continuing the operation of the internal combustion engine.

Another aspect of the present disclosure provides a control method for a vehicle. The vehicle includes an internal combustion engine and a torque application device capable of transmitting and receiving torque to and from an output shaft of the internal combustion engine. The control method includes executing, during operation of the internal combustion engine, a water amount calculation process that calculates a diluted water amount based on an operation state of the internal combustion engine, the diluted water amount being an amount of water contained in lubricating oil in the internal combustion engine, and executing, during operation of the internal combustion engine, a specific process that controls the torque application device such that torque per unit period in the internal combustion engine becomes smaller when the diluted water amount is relatively large compared to when the diluted water amount is relatively small, while continuing the operation of the internal combustion engine.

Other characteristics and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment of a controller for a vehicle will now be described with reference to the drawings.

Overall Configuration of Vehicle

Figure 1:
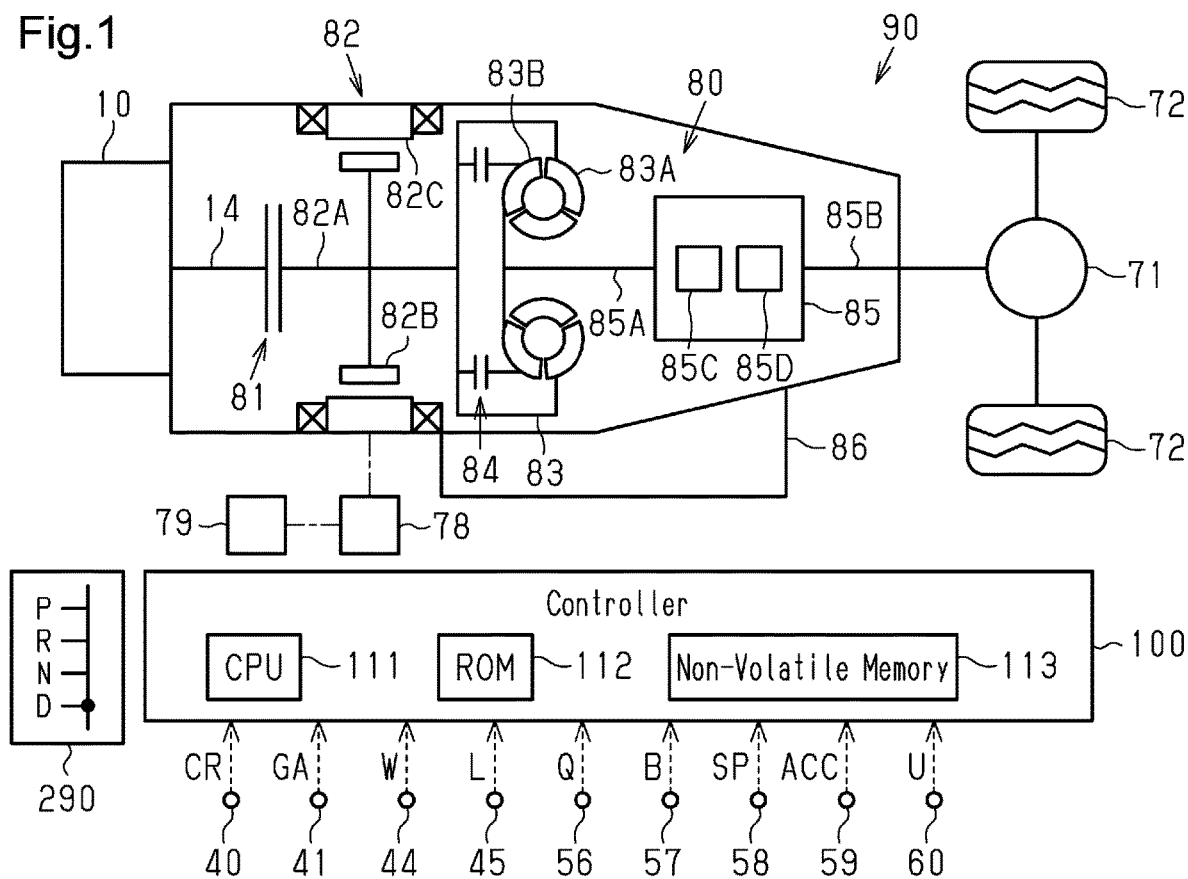
FIG. 1 is a schematic diagram showing the configuration of a vehicle.

As shown in FIG. 1, a vehicle 90 includes an internal combustion engine 10, a drive clutch 81, a motor generator 82, a shifting unit 80, a hydraulic mechanism 86, a differential 71, driven wheels 72, an inverter 78, and a battery 79.

The internal combustion engine 10 is a drive source of the vehicle 90. The internal combustion engine 10 will be described in detail later. The internal combustion engine 10 includes a crankshaft 14. The crankshaft 14 is an output shaft of the internal combustion engine 10.

The motor generator 82 is a drive source of the vehicle 90. The motor generator 82 functions as an electric motor and a generator. The motor generator 82 includes a stator 82C, a rotor 82B, and a rotary shaft 82A. The rotor 82B is rotatable relative to the stator 82C. The rotary shaft 82A rotates integrally with the rotor 82B. The motor generator 82 is electrically connected to the battery 79 via the inverter 78. The battery 79 supplies electric power to the motor generator 82 and receives electric power from the motor generator 82. The inverter 78 converts DC to AC.

The drive clutch 81 is located between the internal combustion engine 10 and the motor generator 82. The drive clutch 81 is brought into a connected state or a disconnected state depending on the hydraulic pressure from the hydraulic mechanism 86. In the connected state, the drive clutch 81 connects the crankshaft 14 to the rotary shaft 82A of the motor generator 82. In the disconnected state, the drive clutch 81 disconnects the crankshaft 14 from the rotary shaft 82A of the motor generator 82. Although not shown in the drawings, the hydraulic mechanism 86 includes oil passages, a solenoid valve that switches a flow path for hydraulic oil, an electric pump that supplies hydraulic oil to the oil passages, and the like.

The shifting unit 80 includes a torque converter 83 and an automatic transmission 85. The torque converter 83 includes a pump impeller 83A, a turbine liner 83B, and a lock-up clutch 84. The torque converter 83 is a fluid coupling that functions to amplify torque. The pump impeller 83A rotates integrally with the rotary shaft 82A of the motor generator 82. The turbine liner 83B rotates integrally with an input shaft 85A of the automatic transmission 85. The lock-up clutch 84 directly connects the pump impeller 83A to the turbine liner 83B depending on the oil pressure from the hydraulic mechanism 86.

The automatic transmission 85 is a stepped transmission capable of switching the gear ratio between multiple stages. In addition to the input shaft 85A, the automatic transmission 85 includes an output shaft 85B, friction engagement elements 85C, and planetary gear mechanisms 85D. FIG. 1 collectively shows the friction engagement elements 85C. The same applies to the planetary gear mechanisms 85D. The friction engagement elements 85C and the planetary gear mechanisms 85D are located between the input shaft 85A and the output shaft 85B. The friction engagement elements 85C include clutches and brakes. That is, the friction engagement elements 85C are clutches or brakes. Each of the friction engagement elements 85C is switched between a connected state and a disconnected state depending on the oil pressure from the hydraulic mechanism 86. Depending on the connected or disconnected state of each friction engagement element 85C, the automatic transmission 85 provides preset gear positions. Each gear position is a forward-traveling gear position, a backward-traveling gear position, or a non-traveling gear position in which power transmission between the input shaft 85A and the output shaft 85B is blocked. Further, the forward-traveling gear position includes gear positions (e.g., first gear to fifth gear). Each gear ratio is set to a different forward-traveling gear position. The larger the gear position, the smaller the gear ratio. The gear ratio is a value obtained by dividing the rotation speed of the input shaft 85A by the rotation speed of the output shaft 85B.

The automatic transmission 85 includes an output shaft 85B that is connected to the left and right driven wheels 72 by the differential 71. The differential 71 allows the rotation speeds of the left and right driven wheels 72 to differ from each other. The drive clutch 81, the motor generator 82, and the shifting unit 80 are accommodated in a single case. That is, the drive clutch 81, the motor generator 82, and the shifting unit 80 form an integrated hybrid transaxle.

The above components are connected to each other to form a drivetrain. In the drivetrain, when the drive clutch 81 is in the connected state, the crankshaft 14 of the internal combustion engine 10 can apply torque to the motor generator 82, the torque converter 83, and the automatic transmission 85. Further, when the drive clutch 81 is in the connected state, the motor generator 82 can apply torque to the crankshaft 14. The motor generator 82, the torque converter 83, and the automatic transmission 85 are torque application devices capable of transmitting and receiving torque to and from the crankshaft 14. Being capable of transmitting and receiving torque to and from the crankshaft 14 means at least one of the following is possible: torque is received from the crankshaft 14, or torque is applied to the crankshaft 14. The motor generator 82 can apply torque to the driven wheels 72 as well as the crankshaft 14.

The vehicle 90 includes a shift device 290 that switches a shift range Q of the automatic transmission 85. The shift device 290 includes a shift lever that is operated by an occupant. When a D range is selected by the shift lever, the automatic transmission 85 provides the forward-traveling gear position. When a R range is selected by the shift lever, the automatic transmission 85 provides the backward-traveling gear position. When an N or P range is selected by the shift lever, the automatic transmission 85 provides the non-traveling gear position.

The vehicle 90 includes a shift sensor 56, a battery sensor 57, a vehicle speed sensor 58, an accelerator sensor 59, and a power switch 60. The shift sensor 56 detects the shift range Q selected by the shift device 290. The battery sensor 57 detects battery information B such as current, voltage, and the temperature of the battery 79. The vehicle speed sensor 58 detects a traveling speed of the vehicle 90 as a vehicle speed SP. The accelerator sensor 59 detects the depression amount of an accelerator pedal in the vehicle 90 as an accelerator operation amount ACC. These sensors each repeatedly send a signal corresponding to the detected information to a controller 100 (described later). The power switch 60 is a system activation switch for the vehicle 90. The power switch 60 transmits a signal U corresponding to the driver's operation to the controller 100 (described later).

Schematic Configuration of Internal Combustion Engine

Figure 2:
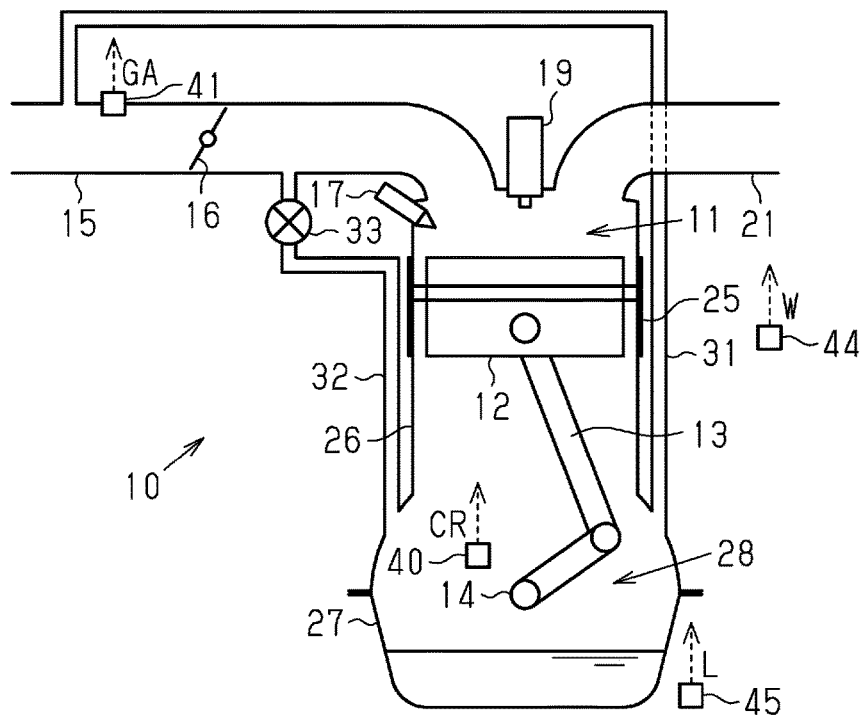
FIG. 2 is a schematic diagram showing the configuration of an internal combustion engine.

As shown in FIG. 2, the internal combustion engine 10 includes a cylinder block 26, an oil pan 27, and a crank chamber 28. The internal combustion engine 10 includes cylinders 11, pistons 12, connecting rods 13, and the crankshaft 14. The number of the cylinders 11 is four. FIG. 2 shows only one of the cylinders 11. The same applies to the pistons 12 and the connecting rods 13. Each piston 12 and each connecting rod 13 are disposed in a corresponding cylinder 11.

The cylinder 11 has a space defined by the cylinder block 26. The cylinder 11 has a space in which air-fuel mixture of fuel and intake air burns. The piston 12 is located in the cylinder 11. The piston 12 reciprocates in the cylinder 11. The piston 12 is coupled to the crankshaft 14 by the connecting rod 13. The crankshaft 14 rotates as the piston 12 reciprocates. The crankshaft 14 is located in the crank chamber 28. The crank chamber 28 is a space defined by a lower portion of the cylinder block 26 and by the oil pan 27. The lower portion of the cylinder block 26 may be referred to as a crankcase. The crank chamber 28 connects to the cylinders 11. The oil pan 27 has a box shape. Lubricating oil, which lubricates various parts in the internal combustion engine 10, is accumulated at the bottom of the oil pan 27.

The internal combustion engine 10 includes a water jacket 25. To facilitate understanding, the water jacket 25 is represented by a thick solid line in FIG. 2. The water jacket 25 is a passage which is partitioned by the cylinder block 26 and through which coolant flows. The water jacket 25 is located around the cylinders 11.

The internal combustion engine 10 includes ignition plugs 19. FIG. 2 shows only one of the ignition plugs 19. Each ignition plug 19 is disposed in a corresponding cylinder 11. The ignition plug 19 ignites the air-fuel mixture of intake air and fuel in the cylinder 11. The internal combustion engine 10 includes fuel injection valves 17. FIG. 2 shows only one of the fuel injection valves 17. Each fuel injection valve 17 is disposed in a corresponding cylinder 11. The fuel injection valve 17 directly supplies fuel to the cylinder 11 without passing through an intake passage 15 (described later). The fuel injection valve 17 injects hydrogen as fuel.

The internal combustion engine 10 includes the intake passage 15, a throttle valve 16, and an exhaust passage 21. The intake passage 15 is connected to the cylinders 11. The intake air from outside flows through the intake passage 15. The throttle valve 16 is located in the intake passage 15. The throttle valve 16 adjusts the amount of intake air (hereinafter referred to as intake air amount GA). The exhaust passage 21 is connected to the cylinders 11. The exhaust gas from each cylinder 11 flows through the exhaust passage 21.

The internal combustion engine 10 includes a blow-by gas recirculation mechanism. The blow-by gas recirculation mechanism is used to return, to the intake passage 15, the blow-by gas that leaks into the crank chamber 28 through the gap between the piston 12 and a wall surface defining the cylinder 11 in the cylinder block 26. The blow-by gas recirculation mechanism includes a first blow-by gas passage 31, a second blow-by gas passage 32, and a PCV valve 33. The first blow-by gas passage 31 connects between the crank chamber 28 and a portion of the intake passage 15 that is located upstream of the throttle valve 16. The second blow-by gas passage 32 connects between the crank chamber 28 and a portion of the intake passage 15 that is located downstream of the throttle valve 16. The PCV valve 33 is located in the second blow-by gas passage 32. During operation of the internal combustion engine 10, the PCV valve 33 opens when the pressure in the portion of the intake passage 15 downstream of the throttle valve 16 becomes lower than a specified value. In this state, the second blow-by gas passage 32 allows the blow-by gas to flow from the crank chamber 28 to the intake passage 15. When the blow-by gas flows through the second blow-by gas passage 32, intake air flows from the intake passage 15 to the crank chamber 28 in the first blow-by gas passage 31.

The internal combustion engine 10 includes a crank position sensor 40, an air flow meter 41, a water temperature sensor 44, and an oil temperature sensor 45. The crank position sensor 40 detects a rotation position CR of the crankshaft 14. The air flow meter 61 detects the intake air amount GA. The water temperature sensor 44 detects a temperature (hereinafter referred to as a coolant temperature W) of the coolant at an outlet of the water jacket 25. The oil temperature sensor 45 detects a temperature L of the lubricating oil accumulated in the oil pan 27. These sensors each repeatedly send a signal corresponding to the detected information to the controller 100 (described later).

Schematic Configuration of Controller

As shown in FIG. 1, the vehicle 90 includes the controller 100. The controller 100 may include one or more processors that execute various processes in accordance with a computer program (software). The controller 100 may be circuitry including one or more dedicated hardware circuits such as application specific integrated circuits (ASICs) that execute at least part of various processes or including a combination thereof. The processor includes a CPU 111 and memories, such as a RAM and a ROM 112. Each memory stores program codes or instructions configured to cause the CPU 111 to execute the processes. The memory, or a computer-readable medium, includes any type of media that are accessible by general-purpose computers and dedicated computers. The controller 100 includes a real-time clock, which is a circuit that generates information related to date and time. Further, the controller 100 includes an electrically-rewritable non-volatile memory 113. When the CPU 111 executes the program stored in the ROM 112, the controller 100 performs various processes described below.

The controller 100 receives the signal U from the power switch 60. After receiving the signal U corresponding to the power switch 60 being turned on, the controller 100 electrically connects the battery 79 to the motor generator 82. As a result, the controller 100 makes the vehicle 90 enter a drivable state. Hereinafter, a period from when the power switch 60 is turned on to when the power switch 60 is turned off is referred to as one trip.

During one trip, the controller 100 repeatedly receives detection signals from various sensors attached to the vehicle 90. Specifically, the controller 100 receives detection signals of the following parameters:

Rotation position CR of the crankshaft 14 detected by the crank position sensor 40

Intake air amount GA detected by the air flow meter 41

Coolant temperature W detected by the water temperature sensor 44

Temperature L of the lubricating oil detected by the oil temperature sensor 45

Shift range Q detected by the shift sensor 56

Battery information B detected by the battery sensor 57

Vehicle speed SP detected by the vehicle speed sensor 58

Accelerator operation amount ACC detected by the accelerator sensor 59

Based on the detection signals received from the various sensors, the controller 100 calculates the following parameters when necessary. Based on the rotation position CR of the crankshaft 14, the controller 100 calculates an engine rotation speed NE, which is the rotation speed of the crankshaft 14. Further, the controller 100 calculates an engine load factor KL based on the engine rotation speed NE and the intake air amount GA. The engine load factor KL is a parameter that determines the amount of air with which the cylinder 11 is filled. Specifically, the engine load factor KL is a value obtained by dividing, by a reference air amount, the amount of air flowing into one cylinder 11 per combustion cycle. The reference air amount changes depending on the engine rotation speed NE. One combustion cycle refers to a series of periods in which one cylinder 11 enters each of the intake stroke, the compression stroke, the expansion stroke, and the exhaust stroke. The controller 100 calculates a state of charge SOC of the battery 79 based on the battery information B. The state of charge SOC of the battery 79 is a value obtained by dividing the remaining capacity of the battery 79 by the full charge capacity of the battery 79. The full charge capacity of the battery 79 can be calculated based on, for example, the voltage of the battery 79 and the temperature of the battery 79. The remaining capacity of the battery 79 can be calculated based on, for example, the voltage and the current in the battery 79.

Control of Internal Combustion Engine

The controller 100 controls the internal combustion engine 10. The controller 100 operates various devices subject to operation, such as the throttle valve 16, the fuel injection valve 17, and the ignition plug 19, to control torque (hereinafter referred to as an engine torque TE) of the internal combustion engine 10 and the engine rotation speed NE. As a result, the controller 100 adjusts the intake air amount GA, the amount of injected fuel, the ignition timing, and the like so that the engine torque TE and the engine rotation speed NE that are requested can be obtained.

Control of Motor Generator

The controller 100 controls the motor generator 82. The controller 100 operates the inverter 78 to control the torque and the rotation speed of the motor generator 82. Accordingly, the controller 100 causes the motor generator 82 to perform a power running operation or a regenerative operation so that the torque and the rotation speed requested by the motor generator 82 can be obtained.

To control the motor generator 82, the controller 100 takes the state of charge SOC of the battery 79 into consideration. For example, during traveling in a hybrid mode (described later), when the state of charge SOC of the battery 79 falls below a predetermined target state of charge V, the controller 100 causes the motor generator 82 to perform the regenerative operation so that the battery 79 stores electric power. When the state of charge SOC of the battery 79 exceeds the target state of charge V, the controller 100 causes the motor generator 82 to perform the power running operation, thereby discharging the battery 79. For example, the controller 100 increases the amount of charge or discharge per unit time as the absolute value of the difference between the state of charge SOC of the battery 79 and the target state of charge V increases. Such control keeps the state of charge SOC of the battery 79 at a value near the target state of charge V while fluctuating up and down across the target state of charge V.

The controller 100 can use two set values as the target state of charge V, which has been described above. A first set value V1, which is one of the set values, is determined in advance as the state of charge SOC of the battery 79 to be provided during normal traveling. A second set value V2, which is the other set value, is larger than the first set value V1. Driving the vehicle 90 using only the electric power of the battery 79 without the power of the internal combustion engine 10 is referred to as electric traveling. That is, in the electric traveling, the vehicle 90 is driven only using the torque of the motor generator 82. The second set value V2 is defined as a minimum value of the state of charge SOC of the battery 79 for the vehicle 90 to travel a specified distance defined in advance. The specified distance is defined as a distance slightly longer than a maximum travel distance during a period in which an electric traveling process (described later) is expected to be continued in a coping process (described later). The first set value V1, the second set value V2, and the specified distance are determined in advance through, for example, experiments or simulations. The controller 100 switches the target state of charge V between the first set value V1 and the second set value V2 through a setting process (described later).

The controller 100 may use, as braking, resistance of the motor generator 82 generated through the power generation of the motor generator 82. Braking that results from the resistance of the motor generator 82 caused by the power generation is referred to as regenerative braking. The controller 100 uses such regenerative braking during, for example, deceleration of the vehicle 90.

Control of Automatic Transmission

The controller 100 controls the automatic transmission 85. The controller 100 operates a solenoid valve or the like of the hydraulic mechanism 86 to control the gear ratio of the automatic transmission 85. Thus, the controller 100 switches the friction engagement elements 85C between the connected and disconnected states. That is, the controller 100 switches the gear position and thus the gear ratio of the automatic transmission 85.

Figure 3:
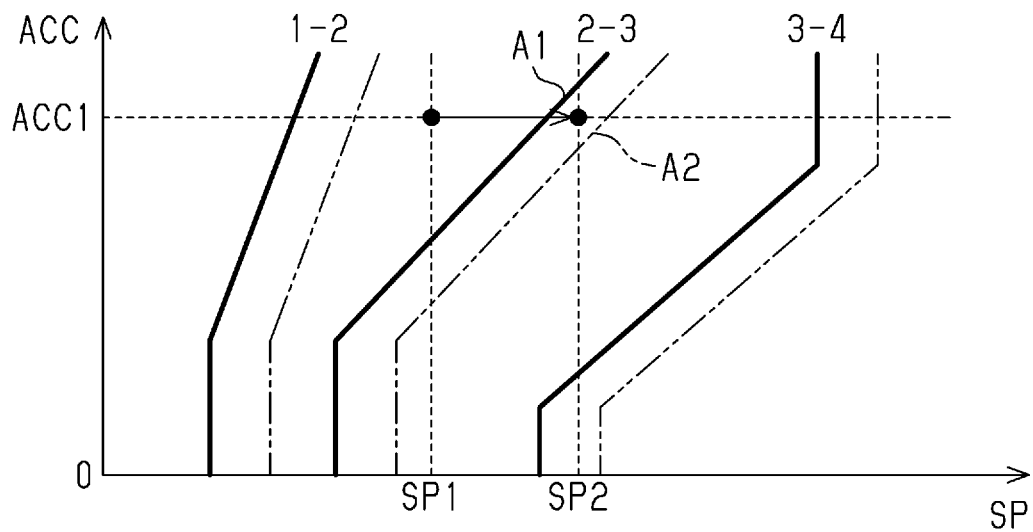
FIG. 3 is a diagram showing an example of a shift map.

The controller 100 stores shift maps in advance as information used to switch the gear position of the automatic transmission 85. The shift maps each define a target shift stage, which is an optimum shift stage in the current traveling situation. The shift maps have the same basic characteristics, which will be described below. As shown in FIG. 3, the shift map has orthogonal coordinates in which the X-axis represents the vehicle speed SP and the Y-axis represents the accelerator operation amount ACC. In the shift map, shift lines used to switch the target shift stage are set. FIG. 3 only shows some of the shift lines. The characteristics of the shift lines in the shift map will now be described with reference to the shift lines shown by the solid lines in FIG. 3. At a specific accelerator operation amount ACC1, the shift lines are arranged such that the selected shift stage increases as the vehicle speed SP increases. At a specific vehicle speed SP2, the shift lines are arranged such that the selected shift stage decreases as the accelerator operation amount ACC increases. When the vehicle speed SP changes so as to cross a specific shift line from a smaller side to a larger side of the vehicle speed SP as viewed from the shift line, the determination of upshifting is established. For example, a shift line used to switch between second and third gears is referred to as a specific shift line A1. When the vehicle speed SP increases from a first vehicle speed SP1 to a second vehicle speed SP2 across the specific shift line A1, the determination of upshifting is established. Further, when the accelerator operation amount ACC changes so as to cross a specific shift line from a larger side to a smaller side of the accelerator operation amount ACC as viewed from the specific shift line, the determination of upshifting is established. When the vehicle speed SP changes so as to cross a specific shift line from a larger side to a smaller side of the vehicle speed SP as viewed from the shift line, the determination of downshifting is established. Further, when the accelerator operation amount ACC changes so as to cross a specific shift line from a smaller side to a larger side of the accelerator operation amount ACC as viewed from the specific shift line, the determination of downshifting is established. When the determination of upshifting or downshifting is established, the controller 100 changes the target shift stage. While upshifting and downshifting are described with reference to the same map in FIG. 3, an upshifting shift map and a downshifting shift map that are different from each other are prepared in reality. The same applies to multiple types of maps, which will be described below. The upshifting shift map and the downshifting shift map have the same basic characteristics, and thus will not be described individually.

The shift maps stored in the controller 100 include a normal map, a low-load map, and a high-load map. First, the difference between the normal map and the low-load map will be described. In FIG. 3, the normal map is indicated by solid lines, and the low-load map is indicated by the long dashed double-short dashed lines. The normal map and the low-load map have the following difference in all of the shift lines. At the specific accelerator operation amount ACC1, the shift line of the low-load map indicated by the long dashed double-short dashed lines is shifted to a side where the vehicle speed SP increases as viewed from the shift line of the normal map indicated by the solid lines. Due to such a difference, even in the same traveling situation, different gear positions may be selected in the case of using the normal map and in the case of using the low-load map. This feature will now be described in detail with reference to the specific shift line A1, which is used to switch between second and third gears, as an example. For example, in a first traveling situation, the vehicle speed SP increases from the first vehicle speed SP1 to the second vehicle speed SP2 across the specific shift line A1 of the normal map when the accelerator operation amount ACC is the first accelerator operation amount ACC1. The second vehicle speed SP2 has a value lower than the vehicle speed SP on a specific shift line A2 of the low-load map. In the first traveling situation, when the normal map is used, the target shift stage is upshifted from second to third gear. When the low-load map is used, the gear position is still second gear. In this manner, a smaller gear position can be selected for the same vehicle speed SP and the same accelerator operation amount ACC in the low-load map than in the normal map. In other words, a larger gear ratio is more likely to be selected in the low-load map than in the normal map.

Figure 4:
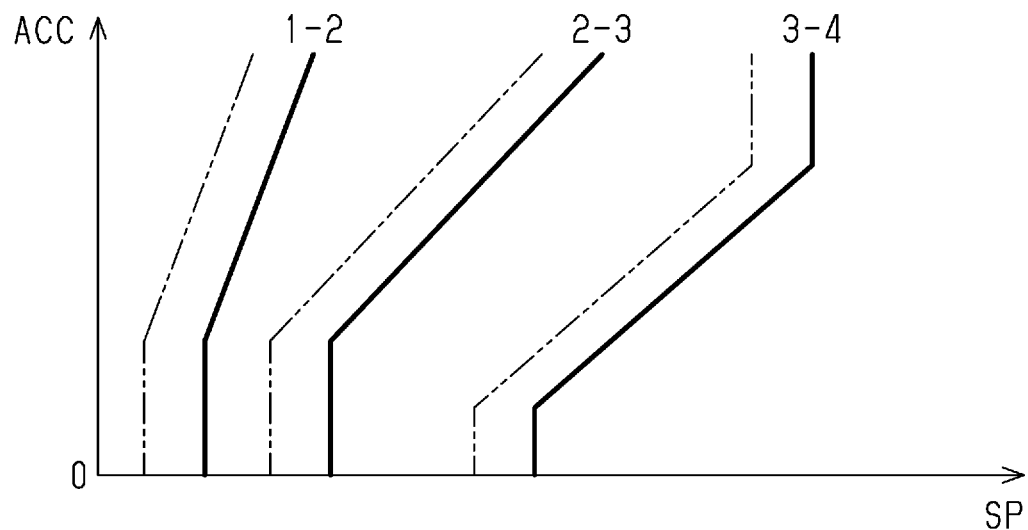
FIG. 4 is a diagram showing an example of a shift map.

Next, the difference between the normal map and the high-load map will be described. As shown in FIG. 4, the high-load map has a characteristic opposite to that of the low-load map. At a specific accelerator operation amount ACC, the shift line of the high-load map indicated by the long dashed double-short dashed lines is shifted to a side where the vehicle speed SP decreases as viewed from the shift line of the normal map indicated by the solid lines. Accordingly, a higher gear position can be selected for the same vehicle speed SP and the same accelerator operation amount ACC when the high-load map is used compared to when the normal map is used. In other words, a smaller gear ratio is more likely to be selected in the high-load map than in the normal map.

Drive Mode of Vehicle

The controller 100 switches the drive mode of the vehicle 90 to the hybrid mode or an electric mode depending on the situation. In the electric mode, the controller 100 brings the internal combustion engine 10 into a stopped state and drives the motor generator 82. The controller 100 uses only the motor generator 82 as a drive source of the vehicle 90. The electric mode includes a normal electric mode in which the drive clutch 81 is brought into the disconnected state and a motoring mode in which the drive clutch 81 is brought into the connected state. The motoring mode is dedicated to the coping process (described later). In the hybrid mode, the controller 100 drives the internal combustion engine 10 and the motor generator 82, and brings the drive clutch 81 into the connected state. The controller 100 uses the internal combustion engine 10 and the motor generator 82 as the drive source of the vehicle 90. In the hybrid mode, the controller 100 may cause the motor generator 82 to generate power using the power of the internal combustion engine 10.

The controller 100 repeatedly calculates a requested drive force, which is requested as a propelling force of the vehicle 90, based on the vehicle speed SP and the accelerator operation amount ACC during one trip. Then, the controller 100 selects the drive mode of the vehicle 90 based on the requested drive force and the latest state of charge SOC of the battery 79. Basically, the controller 100 selects the electric mode when the requested drive force is relatively small, and selects the hybrid mode when the requested drive force is relatively large. Examples of the case in which the requested drive force is relatively small include a case in which the vehicle 90 starts to move and a case in which the vehicle 90 travels with a low-load, small forward acceleration. However, when the state of charge SOC of the battery 79 is relatively low, the controller 100 selects the hybrid mode even if the requested drive force is relatively small.

When selecting the electric mode, the controller 100 controls the motor generator 82 such that the requested drive force is obtained. The control in the hybrid mode will be described in detail later.

Details of Control in Hybrid Mode

A method for controlling the internal combustion engine 10, the motor generator 82, and the automatic transmission 85 when the controller 100 selects the hybrid mode will now be described in detail. Processes for performing control in the hybrid mode include three types of processes: namely, a normal process, a specific process, and an increasing process. The basic content of these three types of processes is common to each other. First, the common content will be described. Then, the difference between the processes will be described.

In each process, the controller 100 determines the target shift stage corresponding to the latest vehicle speed SP and the latest accelerator operation amount ACC based on any one of the shift maps. Then, the controller 100 controls the automatic transmission 85 such that the actual gear position of the automatic transmission 85 matches the target gear position. Further, the controller 100 calculates a target value of the engine rotation speed NE (hereinafter referred to as a target engine rotation speed), a target value of the engine torque TE (hereinafter referred to as a target engine torque), and a target value of the torque of the motor generator 82 (hereinafter referred to as a target motor torque) based on the latest requested drive force and the like. Furthermore, the controller 100 controls the internal combustion engine 10 such that the actual engine torque TE matches the target engine torque and the actual engine rotation speed NE matches the target engine rotation speed. In addition, the controller 100 controls the motor generator 82 such that the actual torque of the motor generator 82 matches the target motor torque. The controller 100 repeats calculation of the target values and control of the automatic transmission 85, the internal combustion engine 10, and the motor generator 82 based on the target values. Although not described in detail, the target engine torque and the target motor torque are values used for each unit period. The unit period is, for example, one combustion cycle of the internal combustion engine 10.

Figure 5:
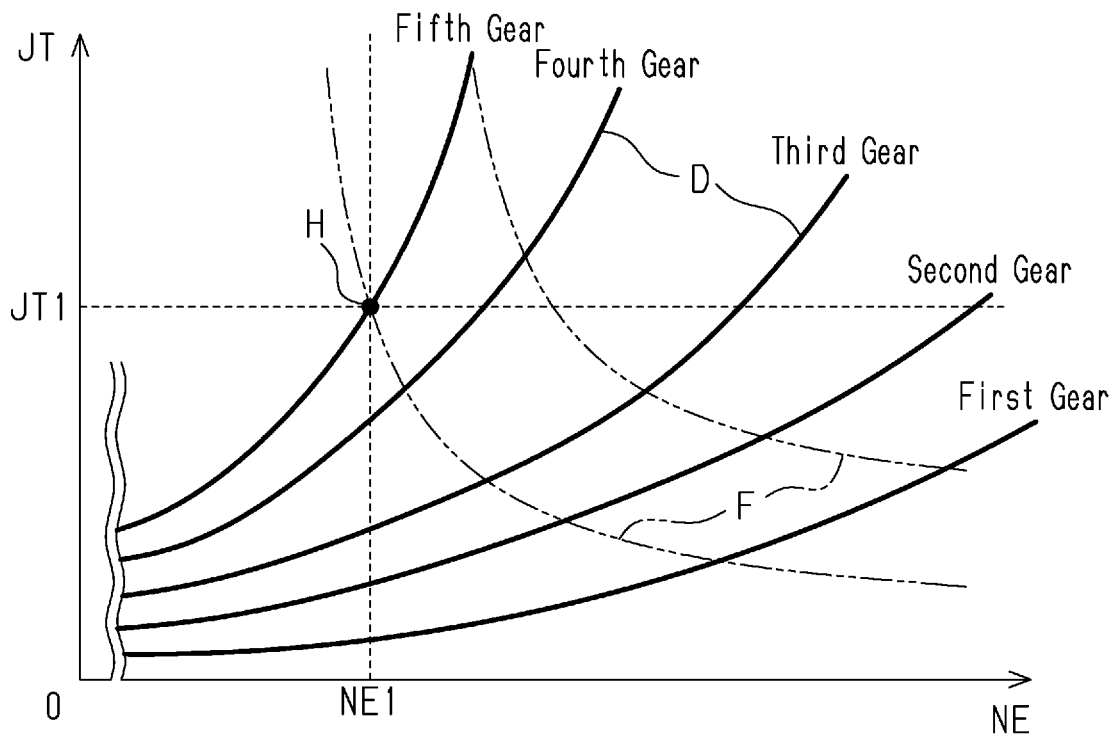
FIG. 5 is a diagram showing an example of a power map.

The controller 100 calculates the target engine rotation speed, the target engine torque, and the target motor torque in the following manner, for example. First, the controller 100 calculates a target value of a system output (hereinafter, referred to as a target system output), which is the total of outputs requested for traveling of the vehicle 90, based on the latest requested drive force and the like. The system output is a parameter defined as the product of a shaft torque JT and the engine rotation speed NE. The shaft torque JT indicates the sum of the engine torque TE and the torque of the motor generator 82. The engine rotation speed NE is equal to the rotation speed of the motor generator 82. After calculating the target system output, the controller 100 calculates a combination of the shaft torque JT and the engine rotation speed NE that correspond to the target system output and the latest target gear position. In the calculation, the controller 100 refers to, for example, a power map shown in FIG. 5. As shown in FIG. 5, the power map illustrates an operation line D for each gear position in orthogonal coordinates with the X-axis representing the engine rotation speed NE and the Y-axis representing the shaft torque JT. The operation line D indicates the relationship between the engine rotation speed NE and the shaft torque JT for each gear position. The operating line D of each gear has the following characteristics. At each gear position, the shaft torque JT increases as the engine rotation speed NE increases. At a specific engine rotation speed NE1, the shaft torque JT increases as the gear position increases. At a specific shaft torque JT1, the engine rotation speed NE increases as the gear position decreases. The power map shows a constant power line F, which is defined by the product of the engine rotation speed NE and the shaft torque JT. As shown by the long dashed double-short dashed line in FIG. 5, the constant power line F is an inversely proportional curve. At a specific system output, the engine rotation speed NE is higher and the shaft torque JT is smaller at a relatively small gear position than at a relatively large gear position. Based on such a power map, the controller 100 calculates a combination of the shaft torque JT and the engine rotation speed NE that correspond to the target system output and the target gear position. To calculate the combination, the controller 100 first specifies the constant power line F corresponding to the target system output. In addition, the controller 100 specifies the operation line D corresponding to the target shift stage. Then, the controller 100 sets the target engine rotation speed to the engine rotation speed NE1 corresponding to an intersection point H of the specified constant power line F and the specified operation line D. Further, the controller 100 sets a target value of the shaft torque JT (hereinafter referred to as a target shaft torque) to the shaft torque JT1 corresponding to the intersection point H. In FIG. 5, the intersection point H is shown in an example in which the target gear position is fifth gear. After calculating the target shaft torque, the controller 100 distributes the target shaft torque to the internal combustion engine 10 and the motor generator 82. For the distribution, the controller 100 takes the state of charge SOC of the battery 79 into account. That is, upon a request for charging the battery 79, the controller 100 sets the target motor torque to a negative value such that the motor generator 82 performs the regenerative operation. Upon a discharge request of the battery 79, the controller 100 sets the target motor torque to a positive value such that the motor generator 82 performs the power running operation. After calculating the target motor torque, the controller 100 sets the target engine torque to the value obtained by subtracting the target motor torque from the target shaft torque. If the state of charge SOC of the battery 79 is the same, the controller 100 always sets the target motor torque to the same value. The controller 100 calculates each target value as described above.

A different shift map used to control the automatic transmission 85 is used in each of the normal process, the specific process, and the increasing process. The controller 100 uses the normal map in the normal process. The controller 100 uses the low-load map in the specific process. The controller 100 uses the high-load map in the increasing process. A smaller gear position is set at the same vehicle speed SP and the same accelerator operation amount MC in the low-load map used in the specific process than in the normal map used in the normal process. That is, a smaller gear position is set for the same requested drive force and thus for the same target system output in the specific process than in the normal process. As described above, the target engine rotation speed increases and the target shaft torque decreases when a smaller gear position is set for the same target system output compared to when a larger gear position is set for the same target system output. If the state of charge SOC of the battery 79 is the same, the target motor torque is the same. That is, the target engine rotation speed becomes higher and the target engine torque becomes smaller when the specific process is performed compared to when the normal process is performed under the condition that the values of the specified parameters are the same as those used during the execution of the specific process. The specified parameters include the vehicle speed SP, the accelerator operation amount ACC, and the state of charge SOC of the battery 79. The specified parameters thus include the requested drive force, the target system output, and the target motor torque determined from the above three parameters. Thus, the controller 100 controls the automatic transmission 85 such that the engine rotation speed NE becomes higher and the engine torque TE per unit period becomes smaller when the specific process is performed compared to when the normal process is performed under the condition that the values of the specified parameters are the same as those when the specific process is performed. In contrast, a larger target gear position is set in the increasing process using the high-load map than in the normal process using the normal map. That is, the automatic transmission 85 is controlled such that the engine rotation speed NE becomes lower and the engine torque TE per unit period becomes larger when the increasing process is performed compared to when the normal process is performed under the condition that the values of the specified parameters are the same as those when the increasing process is performed. The fact that the values of the specified parameters are used under the same condition is simply referred to as "under the same condition."

Among the normal process, the specific process, and the increasing process, the specific process and the increasing process are dedicated to the coping process (described later). That is, when driving the vehicle 90 in the hybrid mode during one trip, the controller 100 basically selects the normal process from the normal process, the specific process, and the increasing process. Then, in relation to the coping process (described in detail later), the controller 100 selects the specific process or the increasing process only when a diluted water amount P, which is the amount of water mixed in lubricating oil, is greater than or equal to a determination value PA. In other words, the controller 100 performs the normal process when the diluted water amount P is less than the determination value PA, and performs the specific process or the increasing process when the diluted water amount P is greater than or equal to the determination value PA. The controller 100 turns on a normal process flag when the normal process is being executed, and turns off the normal process flag when the normal process is not being executed.

Water Amount Calculation Process

The diluted water amount P will now be described in detail. Specifically, the diluted water amount P is the amount of water contained per unit volume of lubricating oil. In the internal combustion engine 10, the blow-by gas leaking from the cylinder 11 to the crank chamber 28 contains moisture that is generated when air-fuel mixture burns. This moisture may be liquefied and mixed into the lubricating oil. When water continues to be mixed into the lubricating oil, the diluted water amount P, which is the amount of water contained in the lubricating oil, increases. At the same time, dilution of the lubricating oil with water progresses. When the temperature L of the lubricating oil rises, the water mixed in the lubricating oil vaporizes. This reduces the diluted water amount P. When the PCV valve 33 is opened in correspondence with the operation state of the internal combustion engine 10, the vaporized moisture flows into the intake passage 15 through the second blow-by gas passage 32. The controller 100 is capable of executing the water amount calculation process, which calculates the diluted water amount P that increases or decreases in this manner.

The controller 100 repeats the water amount calculation process during one trip. The controller 100 calculates one diluted water amount P for a single water amount calculation process. To calculate the diluted water amount P, the controller 100 first calculates a new mixing amount P1 and an evaporation water amount P2. The new mixing amount P1 is the amount of water newly mixed into the lubricant oil from when the water amount calculation process was executed last time to when the water amount calculation process is executed next time. The evaporation water amount P2 is the amount of water evaporated from the lubricant oil from when the water amount calculation process was executed last time to when the water amount calculation process is executed next time. After calculating the new mixing amount P1 and the evaporated water amount P2, the controller 100 calculates, as an updated value, the value obtained by subtracting the evaporated water amount P2 from the new mixing amount P1. Then, the controller 100 adds the updated value to the previous value of the diluted water amount P stored in the non-volatile memory 113. The controller 100 calculates the obtained value as the latest diluted water amount P. After calculating the latest diluted water amount P, the controller 100 stores the value in the non-volatile memory 113. While overwriting new data with old data, the controller 100 temporally stores the diluted water amount P corresponding to a certain period of time. The controller 100 treats the latest value of the temporal data of the diluted water amount P as the previous value. The interval of executing the water amount calculation process is, for example, several seconds.

The controller 100 stores a new map in advance as information used to calculate the new mixing amount P1. The new map represents the relationship between the engine rotation speed NE, the engine load factor KL, and an added water amount. The added water amount is the amount of water newly mixed into the lubricating oil per unit time when the engine rotation speed NE is a specific value and the engine load factor KL is a specific value. The unit time is equal to the interval of executing the water amount calculation process. The engine rotation speed NE, the engine load factor KL, and the added water amount in the new map basically have the following relationship. At the same engine rotation speed NE, the added water amount increases as the engine rotation speed NE increases. As the engine load factor KL increases, the amount of fuel injected increases. Thus, the amount of water generated by the combustion of air-fuel mixture increases. In addition, as the engine load factor KL increases, the pressure in the cylinder 11 increases. Accordingly, the amount of gas leaking from the cylinder 11 to the crank chamber 28 increases. Hence, when the engine load factor KL increases, the amount of water mixed into the crank chamber 28 may increase. The new map reflects these causal relationships. The new map is created based on, for example, experiments or simulations. To calculate the new mixing amount P1, the controller 100 calculates the added water amount corresponding to the current engine rotation speed NE and the current engine load factor KL in the new map as the current new mixing amount P1.

The controller 100 stores an evaporation map in advance as information used to calculate the evaporation water amount P2. The evaporation map represents the relationship between the temperature L of the lubricating oil and a subtracted water amount. The subtracted water amount is the amount of water evaporated from the lubricating oil in a unit time when the temperature L of the lubricating oil is a specific value. As in the new map, the unit time is equal to the interval of executing the water amount calculation process. In the evaporation map, basically, the subtracted water amount increases as the temperature L of the lubricating oil increases. The evaporation map is created based on, for example, experiments or simulations. To calculate the evaporation water amount P2, the controller 100 calculates the subtracted water amount corresponding to the current temperature L of the lubricant oil in the evaporation map as the current evaporation water amount P2.

The engine rotation speed NE and the engine load factor KL that define the added water amount in the new map are parameters indicating the operation state of the internal combustion engine 10. The temperature L of the lubricating oil that defines the subtracted water amount in the evaporation map is also a parameter indicating the operation state of the internal combustion engine 10. The controller 100 uses the new map and the evaporation map to calculate the diluted water amount P. That is, the controller 100 calculates the diluted water amount P based on the operation state of the internal combustion engine 10.

As described above, the controller 100 repeats the water amount calculation process during one trip. In one trip, the vehicle 90 may be in the hybrid mode or the electric mode. During a period in which the vehicle 90 is in the electric mode, the internal combustion engine 10 is off. When the internal combustion engine 10 is off, the combustion of fuel in the internal combustion engine 10 is stopped. When the combustion of the fuel in the internal combustion engine 10 is stopped, there is no water newly generated with the combustion of fuel. Thus, there is almost no water newly mixed into the lubricating oil. If warm-up of the internal combustion engine 10 is completed after the start of one trip, basically, the temperature L of the lubricating oil is sufficiently high. When the temperature L of the lubricating oil increases, the water mixed in the lubricating oil evaporates. Thus, during traveling in the electric mode, the water evaporates from the lubricating oil with no water newly mixed into the lubricating oil, thereby reducing the diluted water amount P. When the internal combustion engine 10 is restarted, the water evaporated from the lubricating oil flows into the intake passage 15 through the second blow-by gas passage 32. To take into account the decrease in the diluted water amount P in such a process, in the present embodiment, the water amount calculation process is continued during one trip including a period in which the vehicle 90 is in the electric mode. When one trip ends, the controller 100 ends the water amount calculation process at that point in time. The temperature L of the lubricating oil may be relatively high at the end of one trip, and water may evaporate from the lubricating oil after the end of one trip. However, a soak period from the end of one trip to the start of the next trip is often sufficiently long. During the soak period, the PCV valve 33 is closed. Thus, the water evaporated from the lubricating oil during the soak period does not return to the intake passage 15. The water is then re-mixed into the lubricating oil as the temperature of the engine including the lubricating oil drops during the soak period. From this point of view, the water amount calculation process is suspended during the soak period. In a case in which the soak period is relatively short, the controller 100 takes the amount of water evaporated during the soak period into account when starting the water amount calculation process in the next trip. That is, in a case in which the soak period is shorter than a specified soak period, the controller 100 calculates the amount of water evaporated during the soak period based on the evaporation map when executing the water amount calculation process for the first time of one trip. Then, the controller 100 calculates the latest diluted water amount P by adding, to the updated value, the value obtained by subtracting the amount of water from the previous value of the diluted water amount P stored in the non-volatile memory 113. The controller 100 stores the specified soak period in advance. The specified soak period is determined in advance through, for example, experiments or simulations as the length of time from when the combustion of fuel in the internal combustion engine 10 is stopped to when the evaporated water starts to be mixed into the lubricating oil again.

Setting Process

During one trip, the controller 100 repeats the setting process to set the target state of charge V of the battery 79. In the setting process, the controller 100 switches the target state of charge V between the first set value V1 and the second set value V2 in relation to the diluted water amount P. Hereinafter, a specific procedure of the setting processing will be described.

Figure 6:
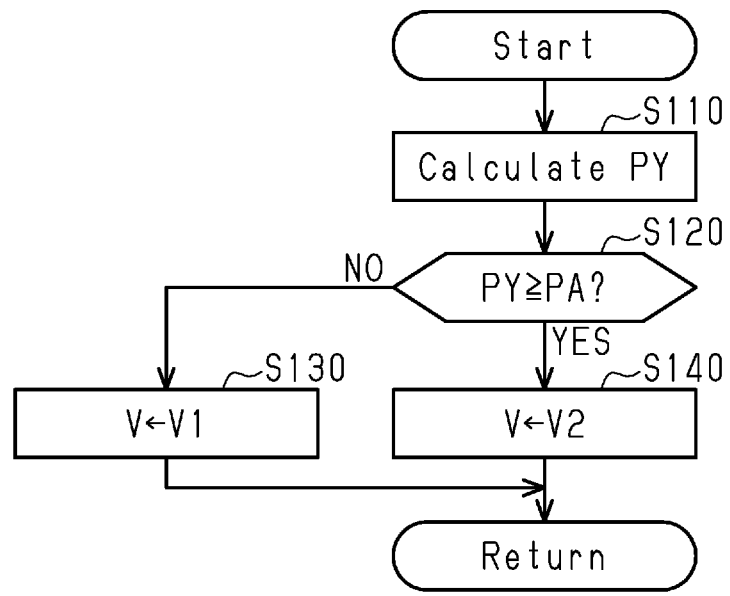
FIG. 6 is a flowchart illustrating a procedure of a setting process.

As shown in FIG. 6, after starting the setting process, the controller 100 first performs the process of step S110. In step S110, the controller 100 calculates an estimated water amount PY. The estimated water amount PY is an estimated value of the diluted water amount P obtained after a predetermined period from the current point in time. The predetermined period is, for example, 10 minutes. The controller 100 stores the predetermined period in advance. The predetermined period is the length of time in which the following effect is expected to be gained with a certain margin when the vehicle 90 continues to travel. The effect is to increase the state of charge SOC of the battery 79 from the first set value V1 to the second set value V2. The predetermined period is defined in advance through, for example, experiments or simulations. To calculate the estimated water amount PY, the controller 100 calculates a water amount change rate, which is a change amount per unit time of the diluted water amount P. Specifically, the controller 100 refers to the latest diluted water amount P and the diluted water amount P calculated immediately before from the temporal data of the diluted water amount P. Then, the controller 100 divides, by the interval of executing the water amount calculation process, the value obtained by subtracting the previous diluted water amount P from the latest diluted water amount P. The controller 100 treats the obtained value as the water amount change rate. Thereafter, the controller 100 calculates the product of the water amount change rate and the predetermined period as the estimated water amount PY. The predetermined period is converted into the same unit as the unit time of the water amount change rate. After calculating the estimated water amount PY, the controller 100 advances the process to step S120.

In step S120, the controller 100 determines whether the estimated water amount PY is greater than or equal to the determination value PA. The controller 100 stores the determination value PA in advance. As the dilution of the lubricating oil progresses, the lubricating function of the lubricating oil deteriorates. To avoid such a functional deterioration, the determination value PA is determined in advance through, for example, experiments or simulations as a value that can be regarded as requiring a reduction in the diluted water amount P. When the estimated water amount PY calculated in step S110 is less than the determination value PA (step S120: NO), the controller 100 advances the process to step S130. In this case, the controller 100 sets the target state of charge V to the first set value V1. If the target state of charge V is set to the first set value V1 at the point in time when the process proceeds to step S130, the controller 100 maintains this state.

In step S120, when the estimated water amount PY is greater than or equal to determination value PA (step S120: YES), the controller 100 advances the process to step S140. In this case, the controller 100 sets the target state of charge V to the second set value V2. If the target state of charge V is set to the second set value V2 at the point in time when the process proceeds to step S140, the controller 100 maintains this state.

After executing the process of step S130 or S140, the controller 100 temporarily ends the series of processes of the setting process. Thereafter, the controller 100 executes the process of step S110 again. The controller 100 repeats the setting process during one trip.

Outline of Coping Process

As described above, the controller 100 basically performs the normal process during traveling in the hybrid mode. That is, controller 100 selects the normal process in a situation in which the vehicle travels in the hybrid mode for the first time after the start of one trip. Subsequently, the controller 100 always selects the normal process in the situation in which the vehicle travels in the hybrid mode, except for a situation in which the controller 100 determines that the diluted water amount P is greater than or equal to the determination value PA in the coping process, which will be described later. During the execution of the normal process, the water newly mixed into the lubricating oil is present because of the operation of the internal combustion engine 10, unlike during traveling in the electric mode. Depending on the traveling state of the vehicle 90, the diluted water amount P may increase due to an increase in the amount of water newly mixed into the lubricating oil. The controller 100 can execute the coping process as a process that copes with such an increase in the diluted water amount P.

The controller 100 can execute a first determination process as a part of the coping process. In the first determination process, the controller 100 determines whether the current diluted water amount P is greater than or equal to the determination value PA. The determination value PA has been described above.

The controller 100 can execute an oil temperature calculation process as a part of the coping process. In the oil temperature calculation process, the controller 100 calculates the current temperature L of the lubricating oil based on the operation state of the internal combustion engine 10. In the present embodiment, the controller 100 calculates the current value of the temperature L of the lubricating oil, which is a parameter indicating the operation state of the internal combustion engine 10, based on the detection signal of the oil temperature sensor 45, which detects the temperature L.

The controller 100 can execute a second determination process as a part of the coping process. In the second determination process, the controller 100 determines whether the current temperature L of the lubricating oil is greater than or equal to the specified temperature LA. The controller 100 stores the specified temperature LA in advance. It is assumed that the temperature L of the lubricating oil is gradually increased in a state in which water is mixed in lubricating oil. When the temperature L of the lubricating oil reaches a temperature relatively close to the boiling point of water, the evaporation amount of water from the lubricating oil starts to increase rapidly. The specified temperature LA is a temperature at which the evaporation amount of water from the lubricating oil starts to increase rapidly (e.g., 70° C.). The specified temperature LA is also a temperature at which warm-up of the internal combustion engine 10 is regarded as being completed. The specified temperature LA is determined in advance through, for example, experiments or simulations.

The controller 100 can execute the specific process as a part of the coping process. The controller 100 performs the specific process on condition that the following three requirements are satisfied.

(CN1) The diluted water amount P is greater than or equal to the determination value PA.
(CN2) The state of charge SOC of the battery 79 is less than the second set value V2.
(CN3) The temperature L of the lubricant oil is greater than or equal to the specified temperature LA.

As described above, the specific process is one of the processes that control the vehicle 90 in the hybrid mode. That is, in the specific process, the controller 100 copes with the diluted water amount P while continuing the operation of the internal combustion engine 10. In this process, the controller 100 controls the automatic transmission 85 such that the engine torque TE becomes smaller than that in a case in which the normal process is performed under the same condition. Such control of the automatic transmission 85 has already been described in relation to the use of the low-load map in the specific process. During execution of the normal process, which has been compared with the specific process above, the diluted water amount P is less than the determination value PA. Accordingly, the controller 100 controls the automatic transmission 85 such that the engine torque TE becomes smaller when the specific process is performed compared to when the diluted water amount P is less than the determination value PA under the same condition. That is, the controller 100 controls the automatic transmission 85 such that the engine torque TE becomes smaller when the diluted water amount P is relatively large compared to when the diluted water amount P is relatively small, while continuing the operation of the internal combustion engine 10.

The controller 100 can execute the increasing process as a part of the coping process. When the requirements CN1, CN2 of the three requirements are satisfied but the requirement CN3 is not satisfied, the controller 100 performs the increasing process instead of the specific process. As described above, the increasing process is one of the processes that control the vehicle 90 in the hybrid mode. That is, in the increasing process, the controller 100 copes with the diluted water amount P while continuing the operation of the internal combustion engine 10 in the same manner as the specific process. In this process, the controller 100 controls the automatic transmission 85 such that the engine torque TE becomes larger in the increasing process than that in a case in which the normal process is performed under the same condition. Such control of the automatic transmission 85 has already been described in relation to the use of the high-load map in the increasing process. From the same viewpoint as that of the specific process, the increasing process has the following effect. The controller 100 controls the automatic transmission 85 such that the engine torque TE becomes larger when the increasing process is performed compared to when the diluted water amount P is less than the determination value PA under the same condition. In other words, the controller 100 controls the automatic transmission 85 such that the engine torque TE becomes larger when the diluted water amount P is relatively large compared to when the diluted water amount P is relatively small, while continuing the operation of the internal combustion engine 10.

The controller 100 can execute the electric traveling process as a part of the coping process. When the requirement CN1 of the three requirements is satisfied but the requirement CN2 is not satisfied, the controller 100 performs the electric traveling process instead of the specific process regardless of whether the requirement CN3 is satisfied. The electric traveling process is a process that causes the vehicle 90 to travel in the motoring mode, which is one type of the electric mode. That is, in the electric traveling process, the controller 100 causes the vehicle 90 to travel only with the torque of the motor generator 82 in a state in which the combustion of fuel in the internal combustion engine 10 is stopped. Further, in the electric traveling process, the controller 100 brings the drive clutch 81 into the connected state. This causes the crankshaft 14 to rotate together with the rotary shaft 82A of the motor generator 82. That is, the torque of the motor generator 82 is applied to the crankshaft 14.

The specific process, the increasing process, and the electric traveling process may be hereinafter collectively referred to as a water amount reduction process.

Specific Procedure of Coping Process

During one trip, the controller 100 executes the coping process when a start condition of the coping process is satisfied. The start condition is that the vehicle 90 is driven by the normal process. The controller 100 determines that the start condition is satisfied when the vehicle speed SP is greater than 0 and the normal process flag is ON.

Figure 7:
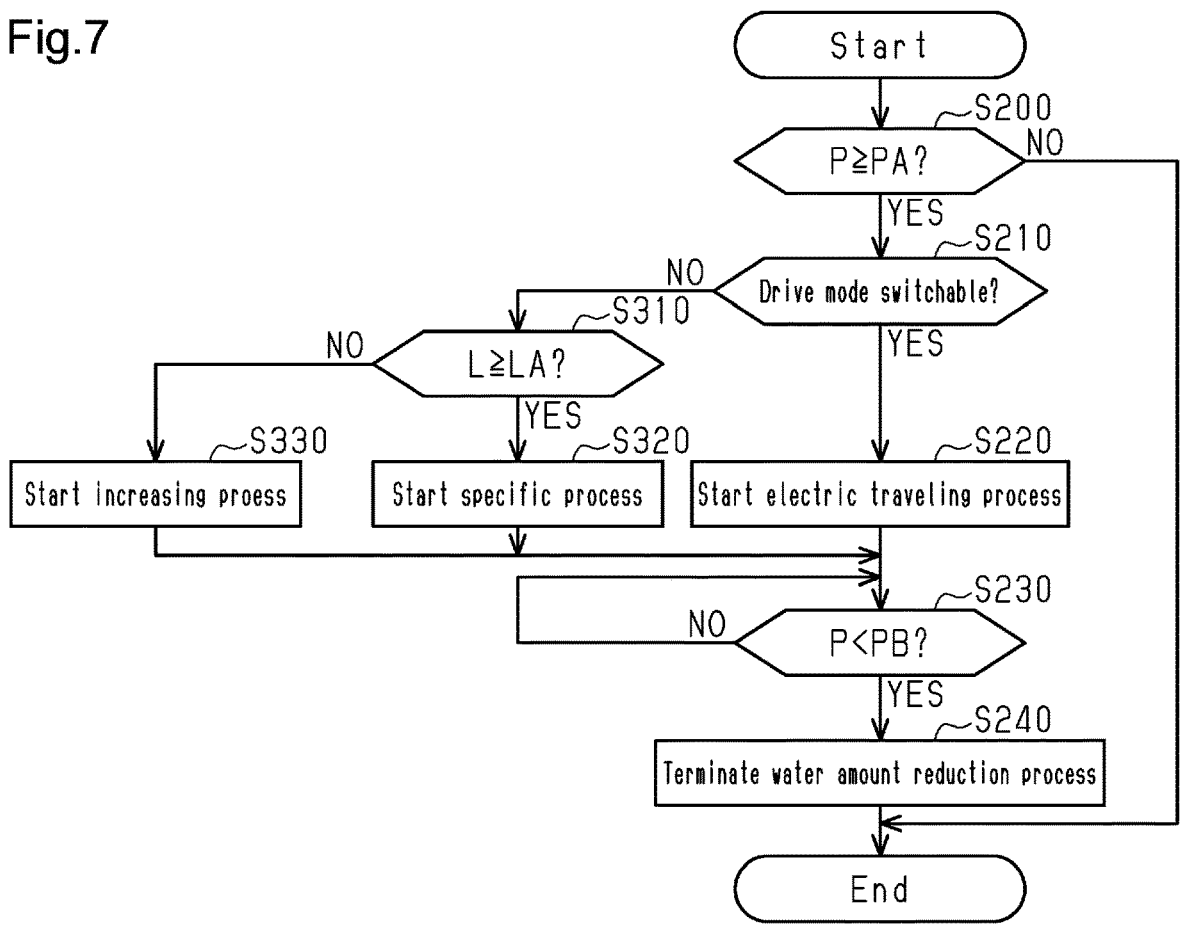
FIG. 7 is a flowchart illustrating a procedure of a coping process.

As shown in FIG. 7, after starting the coping process, the controller 100 first executes the process of step S200. In step S200, the controller 100 determines whether the current diluted water amount P is greater than or equal to the determination value PA. To make the determination in step S200, the controller 100 refers to the latest value of the diluted water amount P in the temporal data. Then, the controller 100 treats this value as the current diluted water amount P. When the diluted water amount P is less than the determination value PA (step S200: NO), the controller 100 temporarily ends the series of processes of the coping process. In this case, if the start condition is satisfied, the controller 100 executes the process of step S200 again. The process of step S200 corresponds to the first determination process.

In step S200, when the current diluted water amount P is greater than or equal to determination value PA (step S200: YES), the controller 100 advances the process to step S210.

In step S210, the controller 100 determines whether the drive mode of the vehicle 90 can be switched from the hybrid mode to the motoring mode. Specifically, the controller 100 determines whether the state of charge SOC of the battery 79 is greater than or equal to the second set value V2. When the state of charge SOC of the battery 79 is greater than or equal to the second set value V2 (step S210: YES), the controller 100 advances the process to step S220.

In step S220, the controller 100 starts the electric traveling process. That is, the controller 100 switches the drive mode of the vehicle 90 to the motoring mode. Thereafter, the controller 100 continues traveling of the vehicle 90 in the motoring mode. After executing the process of step S220, the controller 100 advances the process to step S230. Subsequently, before executing step S240, the controller 100 does not change the drive mode or the type of the water amount reduction process. The same applies to step S320 and step S330, which will be described later.

In step S210, when the state of charge SOC of the battery 79 is less than the second set value V2 (step S210: NO), the controller 100 advances the process to step S310. Then, in step S310, the controller 100 determines whether the current temperature L of lubricant oil is greater than or equal to the specified temperature LA. To make the determination in step S310, the controller 100 calculates the latest lubricant temperature L received from the oil temperature sensor 45 as the current lubricant temperature L. When the current temperature L of the lubricant oil is greater than or equal to the specified temperature LA (step S310: YES), the controller 100 advances the process to step S320. The process of step S310 serves as the oil temperature calculation process and the second determination process.

In step S320, the controller 100 switches the processing content from the normal process to the specific process while maintaining the hybrid mode. Then, the controller 100 continues the traveling of the vehicle 90 by performing the specific process. After executing the process of step S320, the controller 100 advances the process to step S230.

In step S310, when the current temperature L of the lubricant oil is lower than the specified temperature LA (step S310: NO), the controller 100 advances the process to step S330. Then, in step S330, the controller 100 switches the processing content from the normal process to the increasing process while maintaining the hybrid mode. Subsequently, the controller 100 continues the traveling of the vehicle 90 by performing the increasing process. After executing the process of step S330, the controller 100 advances the process to step S230.

In step S230, the controller 100 determines whether the current diluted water amount P is less than an end value PB. The controller 100 stores the end value PB in advance. The end value PB is determined in advance through, for example, experiments or simulations as a value at which the diluted water amount P becomes sufficiently small and the water amount reduction process is allowed to be ended. To make the determination in step S230, the controller 100 obtains the current diluted water amount P in the same manner as in step S200. Then, when the current diluted water amount P is greater than or equal to the end value PB (step S230: NO), the controller 100 executes the process of step S230 again. Thereafter, the controller 100 repeats the process of step S230 until the current diluted water amount P becomes less than the end value PB. Then, when the current diluted water amount P becomes less than the end value PB (step S230: YES), the controller 100 advances the process to step S240.

In step S240, the controller 100 terminates the water amount reduction process that has been performed so far. Then, the controller 100 resumes normal processing. That is, the controller 100 subsequently resumes traveling of the vehicle 90 in the hybrid mode based on the normal process or in the normal electric mode. Thereafter, the controller 100 temporarily ends the series of processes of the coping process. Then, if the condition for starting the coping process is satisfied, the controller 100 performs the process of step S200 again.

The details of the coping process have been described above. The period for the diluted water amount P to decrease to less than the end value PB after the start of the water amount reduction process is, for example, about several minutes. The vehicle 90 may be stopped during the execution of the water amount reduction process. When the vehicle 90 is stopped during the execution of the water amount reduction process, the controller 100 advances the process to step S240 at that point in time and terminates the coping process. When the vehicle 90 is stopped, there is substantially no water newly mixed into the lubricating oil, in the same manner as in the case described regarding the changes in the diluted water amount P in the electric mode.

Operation of Embodiment (A) Setting Process

During one trip, the controller 100 switches the target state of charge V of the battery 79 depending on the tendency of temporal changes in the diluted water amount P. When the diluted water amount P tends to increase (step S120: YES), the controller 100 switches the target state of charge V from the first set value V1 to the second set value V2 so that the diluted water amount P will be coped with in the future (step S140). Accordingly, the state of charge SOC of the battery 79 gradually increases toward the second set value V2. As a result, when the diluted water amount P reaches the determination value PA in the future, switching to the motoring mode is readily performed in step S210 of the coping process.

(B) Electric Traveling Process

It is assumed that the increased tendency of the diluted water amount P continues and then the diluted water amount P reaches the determination value PA (step S200: YES). In this step, it is assumed that the state of charge SOC of the battery 79 has increased to the second set value V2 (step S210: YES). In this case, the controller 100 performs the electric traveling process as the water amount reduction process (step S220). That is, the controller 100 switches the drive mode of the vehicle 90 from the hybrid mode to the motoring mode. Then, the controller 100 stops fuel injection and ignition in the internal combustion engine 10 to stop combustion of air-fuel mixture. As a result, there is substantially no water newly mixed into the crank chamber 28 and then into lubricating oil. Since the internal combustion engine 10 has been driven before the start of the electric running process, basically, the temperature L of the lubricating oil at the start of the electric traveling process is relatively high. Further, in the electric traveling process, the crankshaft 14 is rotated by the torque of the motor generator 82. The rotation of the crankshaft 14 agitates the lubricating oil. This may promote an increase in the temperature L of the lubricating oil. Thus, the temperature L of the lubricating oil is kept relatively high during the execution of the electric traveling process. Further, the amount of water evaporated from the lubricating oil remains relatively large. The amount of water newly mixed into the lubricating oil is substantially eliminated, and the evaporation of water from the lubricating oil is continued so that the diluted water amount P gradually decreases.

(C) Specific Process

When the increased tendency of the diluted water amount P continues and the diluted water amount P reaches the determination value PA (step S200: YES), the state of charge SOC of the battery 79 has the possibility of not reaching the second set value V2 depending on the situation (step S210: NO). If the temperature L of the lubricant oil is greater than or equal to the specified temperature LA (step S310: YES), the controller 100 performs the specific process as the water amount reduction process. That is, the controller 100 switches the processing content from the normal process to the specific process while maintaining the hybrid mode (step S320). The process is advanced to step S320 in the following situation. Although the temperature L of the lubricating oil is relatively high and the evaporation amount of water from the lubricating oil is relatively large, more water is mixed into the lubricating oil than the evaporation amount, resulting in a situation in which the diluted water amount P is relatively large. For example, after completion of warm-up of the internal combustion engine 10, the engine torque TE and thus the engine load factor KL remain relatively high. In such a situation, the controller 100 performs the specific process.

As described above, in the specific process using the low-load map as the shift map, the engine torque TE per unit period decreases. As a result, the engine load factor KL and thus the pressure in the cylinder 11 decrease. This reduces the amount of gas leaking from the cylinder 11 to the crank chamber 28. This also reduces the amount of water that reaches the crank chamber 28 together with the gas and is mixed with the lubricating oil. In the specific process, since the operation of the internal combustion engine 10 is continued, the temperature L of the lubricating oil remains relatively high from before the start of the specific process. Additionally, in the specific process, the engine rotation speed NE increases in relation to the shift map that is used. As a result, the temperature L of the lubricating oil is expected to further increase through the stirring of the lubricating oil by the crankshaft 14. Thus, the amount of water evaporated from the lubricating oil remains relatively large. The amount of water newly mixed into the lubricating oil decreases, and the evaporation of water from the lubricating oil is continued so that the diluted water amount P gradually decreases.

(D) Increasing Process

When the diluted water amount P increases to the determination value PA (step S200: YES), the following situation may occur. The state of charge SOC of the battery 79 has not reached the second set value V2 (step S210: NO) and the temperature L of the lubricant oil is lower than the specified temperature LA (step S310: NO). In this case, the controller 100 switches the processing content from the normal process to the increasing process while maintaining the hybrid mode (step S330). The process is advanced to step S330 when, for example, the internal combustion engine 10 has not been warmed up yet and the temperature L of the lubricant oil is sufficiently low. In this case, since the temperature L of the lubricating oil is relatively low, the amount of water evaporated from the lubricating oil decreases. Accordingly, the diluted water amount P may become greater than or equal to the determination value PA. In such a situation, the controller 100 performs the increasing process.

As described above, in the increasing process using the high-load map, the engine torque TE per unit period increases. As a result, the engine load factor KL increases, and the temperature L of the lubricating oil rapidly increases together with the temperature of the entire internal combustion engine 10. Then, the amount of water evaporated from the lubricating oil increases. As a result, the diluted water amount P decreases.

Advantages of Embodiment (1) As described in the above operation (C), the execution of the specific process reduces the amount of water newly mixed into lubricating oil. The controller 100 performs the specific process when the temperature L of the lubricating oil is relatively high. In such a situation in which the amount of water evaporated from the lubricating oil is relatively large, the specific process is further performed to reduce the amount of water mixed into the lubricating oil, thereby quickly reducing the diluted water amount P.

(2) As described in the operation (D), the execution of the increasing process rapidly increases the temperature L of lubricating oil. Thus, the controller 100 performs the increasing process when the temperature L of the lubricating oil is relatively low. The execution of the increasing process eliminates the situation in which water is less likely to evaporate from the lubricating oil. Thus, the diluted water amount P is quickly reduced.

(3) In a case in which the state of charge SOC of the battery 79 is relatively high when the diluted water amount P increases, the controller 100 performs the electric traveling process. As described in the above operation (B), when the electric traveling process is performed, in the internal combustion engine 10, the newly generated water and thus the water newly mixed into lubricating oil are substantially eliminated. The temperature L of the lubricating oil is kept relatively high through the stirring of the lubricating oil by the crankshaft 14, which rotates together with the motor generator 82. Thus, the diluted water amount P is quickly reduced.

Modifications

The present embodiment may be modified as follows. The present embodiment and the following modifications can be combined as long as they remain technically consistent with each other.

In the setting process, the method for calculating the estimated water amount PY is not limited to the example of the above embodiment. If the diluted water amount P obtained after the predetermined period can be properly calculated, any method may be employed to calculate the estimated water amount PY. For example, the estimated water amount PY may be calculated using regression analysis. In this case, a regression line of the diluted water amount P is calculated in an orthogonal coordinate system in which the X-axis represents time and the Y-axis represents the diluted water amount P. Then, the slope of the regression line is multiplied by the predetermined period. The estimated water amount PY may be calculated without using the history of the diluted water amount P. For example, the estimated water amount PY may be calculated based on the traveling state of the vehicle 90. When the vehicle 90 continues to accelerate, the engine load factor KL of the internal combustion engine 10 keeps increasing. Thus, the diluted water amount P may increase thereafter. Based on this point, for example, a map may be created that represents the relationship between the duration in which the forward acceleration of the vehicle 90 is kept greater than 0 and the diluted water amount P obtained after the predetermined period from the current state. Then, the estimated water amount PY may be calculated based on such a map. The forward acceleration may be, for example, a differential value of the vehicle speed SP, and may be detected using an acceleration sensor provided in the vehicle 90. To calculate the estimated water amount PY, the information on driving habits of the occupant may be used. For example, it is assumed that the diluted water amount P tends to increase to a point near a predetermined value subsequent to the predetermined period after the occupant performed a specific operation. In this case, on condition that the operation was performed, the estimated water amount PY obtained after the predetermined period from the point in time when the operation was performed may be calculated as the predetermined value. Such a predetermined value may be learned at any time during traveling of the vehicle 90.

The predetermined period for calculating the estimated water amount PY may be changed. The predetermined period only needs to be set in consideration of the following condition. The condition is to ensure a period required to increase the state of charge SOC of the battery 79 to such an extent that traveling by the electric traveling process is possible.

The threshold value of the estimated water amount PY used in step S120 of the setting process may be a value different from the determination value PA used in step S200 of the coping process. For example, the threshold value may be smaller than the determination value PA. This allows the target state of charge V to be switched to the second set value V2 from an earlier stage and thus increases the state of charge SOC of the battery 79. The threshold value only needs to be suitable for increasing the state of charge SOC of the battery 79 in advance in order to cope with an increase in the estimated water amount PY that will occur in the future.

In the method for determining the second set value V2, the specified distance does not have to be taken into consideration as in the above embodiment. For example, if the second set value V2 is not used as a threshold value for the determination in step S210 of the coping process as in a modification described later, the second set value V2 may be determined regardless of the distance traveled in the electric traveling process. Even in this case, if the second set value V2 is maximized, the charging of the battery 79 is promoted readily. If the state of charge SOC of the battery 79 increases, the electric traveling process is used as the water amount reduction process more often.

In the specific process performed in the coping process, the content of the low-load map is not limited to the example of the above embodiment. That is, in the low-load map, all of the shift lines do not have to be shifted to the side where vehicle speed SP becomes higher with respect to the normal map. For example, only some of the shift lines may be shifted to the side where vehicle speed SP becomes higher with respect to the normal map. Alternatively, a different low-load map may be prepared for each diluted water amount P. In the comparison between the low-load map and the normal map for the same vehicle speed SP and the same accelerator operation amount ACC, the low-load map only needs to have at least a part of a region in which a gear position lower than that in the normal map is selected. If such a low-load map is used, the specific process allows the gear ratio set for the automatic transmission 85 to be larger than that when the normal process is performed under the same condition.

In the same manner as the above modification, the content of the high-load map is not limited to the example of the above embodiment. That is, in the comparison between the high-load map and the normal map for the same vehicle speed SP and the same accelerator operation amount ACC, the high-load map only needs to have at least a part of a region in which a gear position higher than that in the normal map is selected. If such a high-load map is used, the increasing process allows the gear ratio set for the automatic transmission 85 to be smaller in than that when the normal process is performed under the same condition.

The content of the specific process is not limited to the example of the above embodiment. In the specific process, another aspect may be employed instead of or in addition to the aspect of the above embodiment. Even when the other aspect is employed, the engine torque TE only needs to be made smaller when the specific process is performed compared to when the normal process is performed under the same condition. In the other aspect employed in the specific process, for example, the motor generator 82 may be used. When the motor generator 82 performs a power running operation, the motor generator 82 applies torque to the crankshaft 14 of the internal combustion engine 10. In the other mode employed in the specific process, the target motor torque used when the motor generator 82 performs the power running operation may be larger, by a certain constant value, than the target motor torque used when the normal process is performed under the same condition. In this case, the ratio of the target engine torque to the target shaft torque decreases. Thus, the engine torque TE per unit period becomes smaller when this aspect is employed compared to when the normal process is performed under the same condition. When the engine torque TE decreases, the amount of water newly mixed into lubricating oil decreases as in the above embodiment.

In the other mode employed in the specific process, for example, the lock-up clutch 84 may also be used. The lock-up clutch 84 is a torque application device that receives torque from the crankshaft 14 of the internal combustion engine 10. The lock-up clutch 84 switches between the connected state and the disconnected state depending on hydraulic pressure from the hydraulic mechanism 86. In the connected state, the lock-up clutch 84 directly connects the pump impeller 83A to the turbine liner 83B as described in the above embodiment. In the disconnected state, the lock-up clutch 84 disconnects the pump impeller 83A from the turbine liner 83B. When the lock-up clutch 84 is switched from the connected state to the disconnected state in a situation in which the same requested drive force and thus the same target system output are used, the shaft torque JT and thus the engine torque TE decrease whereas the engine rotation speed NE increases. This characteristic may be utilized to employ an aspect in which the lock-up clutch 84 is brought into the connected state in the normal process whereas the lock-up clutch 84 is brought into the disconnected state in the specific process. This allows the engine torque TE to be smaller when the specific process is performed compared to when the normal process is performed under the same condition.

The content of the increasing process is not limited to the example of the above embodiment. In the increasing process, another aspect may be employed instead of or in addition to the aspect of the above embodiment. Even when the other aspect is employed, the engine torque TE only needs to be larger when the increasing process is performed compared to when the normal process is performed under the same condition. For example, in the other aspect replaced with the aspect of the above embodiment, the target motor torque used when the motor generator 82 performs a power running operation may be smaller than, by a certain constant value, the target motor torque used when the normal process is performed under the same condition. In this case, the ratio of the target engine torque to the target shaft torque increases. Thus, the engine torque TE per unit period becomes larger when this aspect is employed compared to when the normal process is performed under the same condition. When the engine torque TE increases, the temperature L of the lubricating oil increases quickly as in the above embodiment.

There may be a case in which the vehicle 90 enters a deceleration state while being still in the hybrid mode. In another aspect of the increasing process, for example, regenerative braking may be prohibited during deceleration. When the regenerative braking is prohibited, the battery 79 is charged less often. Accordingly, the state of charge SOC of the battery 79 tends to decrease so that the state of charge SOC of the battery 79 falls below the target state of charge V more often. This increases the opportunity to charge the battery 79 by causing the motor generator 82 to generate electric power with the power of the internal combustion engine 10. When the motor generator 82 generates electric power with the power of the internal combustion engine 10, the engine torque TE is increased by an amount corresponding to the generated electric power. Thus, the aspect of prohibiting regenerative braking is also effective as the increasing process. When the vehicle 90 enters a deceleration state while being still in the hybrid mode, the internal combustion engine 10 may be performing fuel cut-off or may be idling. The idling means that the internal combustion engine 10 is operated at a minimum engine rotation speed NE at which the internal combustion engine 10 can operate independently.

In the motoring mode, the combustion of air-fuel mixture in the internal combustion engine 10 does not have to be stopped. That is, in the motoring mode, the crankshaft 14 may be rotated by the motor generator 82 with the combustion of air-fuel mixture continued in the internal combustion engine 10. The internal combustion engine 10 is driven in a state in which the torque output from the internal combustion engine 10 is limited (e.g., idling)

In the electric traveling process, the vehicle 90 may be driven by the normal electric mode instead of the motoring mode.

The aspect of determining whether switching to the electric mode is possible in step S210 of the coping process is not limited to the example of the above embodiment. For example, whether switching to the electric mode is possible may be determined based on a threshold value that is different from the second set value V2. The determination in step S210 may be performed in consideration of not only the state of charge SOC of the battery 79 but also the current requested drive force.

Depending on the state of charge SOC of the battery 79, the electric traveling process may be switched to another water amount reduction process during execution of the electric traveling process.

The method for determining how to terminate the specific process, the increasing process, and the electric traveling process is not limited to the example of the above embodiment. For example, the specific process may be terminated when a predetermined certain period has elapsed since the start of the specific process. In this case, the certain period only needs to be set to an appropriate value in consideration of the rate of decrease in the diluted water amount P. The same applies to the time of terminating the motoring process and the increasing process. The duration until completion may be set to different lengths between the specific process, the increasing process, and the electric traveling process.

The electric traveling process does not have to be performed in the coping process. That is, the processes of step S210 and step S220 in the coping process may be omitted. When the result of the determination in step S200 is YES, the specific process or the increasing process may be performed regardless of the state of charge SOC of the battery 79. If the electric traveling process is omitted from the coping process, there is no need to switch the target state of charge V to the second set value V2 depending on the estimated water amount PY in order to increase the target state of charge V. That is, the setting process may be omitted. In this case, for example, the target state of charge V may be set to the first set value V1 through one trip, or the target state of charge V may be changed from the first set value V1 to another value depending on the situation.

In the coping process, the increasing process does not have to be performed. That is, step S330 and step S310 in the coping process may be omitted. Then, the diluted water amount P may be decreased by the specific processing when the diluted water amount P is greater than or equal to the determination value PA regardless of the level of the temperature L of lubricating oil. As in the above modification, the increasing process as well as the electric traveling process may be omitted from the coping process. Instead, only the increasing process may be omitted without omitting the electric traveling process.

The method for determining the determination value PA may be changed. The determination value PA only needs to be a value used to determine whether a step for reducing the diluted water amount P is necessary. The determination value PA does not have to be fixed, and may be varied depending on the situation. The specific process only needs to be performed such that the engine torque TE becomes smaller when the diluted water amount P is relatively large compared to when the diluted water amount P is relatively small.

The method for determining the specified temperature LA may be changed. The specified temperature LA may be lower than a temperature at which warm-up of the internal combustion engine 10 is completed. In view of the relationship between the amount of water evaporated from lubricating oil and the amount of water newly mixed into the lubricating oil, the specified temperature LA only needs to be set such that a more appropriate one of the specific process and the increasing process can be selected.

The method for calculating the diluted water amount P is not limited to the example of the above embodiment. The diluted water amount P may be calculated based on the operation state of the internal combustion engine 10. For example, the coolant temperature W may be taken into consideration to calculate the diluted water amount P. The coolant temperature W reflects the temperature of the wall surface defining the cylinder 11 in the cylinder block 26. Depending on the temperature of the wall surface, the likelihood of condensation on the wall surface and thus the amount of water reaching the crank chamber 28 may vary. From this point of view, the coolant temperature W is also effective as a parameter for calculating the diluted water amount P. To calculate the diluted water amount P, a sensor that detects the amount of water in lubricating oil may be used. In this case, such a sensor only needs to be attached to the internal combustion engine 10. The diluted water amount P may be calculated using a map for which machine learning has been performed in advance.

The method for calculating the temperature L of lubricating oil is not limited to the example of the above embodiment. The temperature L of lubricating oil only needs to be calculated based on the operation state of the internal combustion engine 10. Instead of detecting the temperature L of lubricating oil using the sensor, for example, the temperature L may be calculated based on parameters such as an integrated value of the intake air amount GA from the start of the internal combustion engine 10 and the coolant temperature W. When such an aspect is employed, a map representing the relationship between these parameters and the temperature L of lubricating oil may be created in advance through experiments or simulations.

The configuration of the vehicle 10 is not limited to the example of the above embodiment. For example, the number of the cylinders 11 may be changed from the number in the above embodiment. The fuel injection valve 17 may be changed to the type of a valve that supplies fuel to the cylinder 11 through the intake passage 15. The fuel injected by the fuel injection valve 17 is not limited to hydrogen and may be, for example, gasoline. The configuration of the blow-by gas treatment mechanism may be changed from that of the above embodiment. Any blow-by gas processing mechanism may be used if it can return blow-by gas from the crank chamber 28 to the intake passage 15. A component other than the blow-by gas treatment mechanism may be used to discharge moisture from the crank chamber 28. For example, a ventilation passage may be provided to connect between the crank chamber 28 to the outside of the internal combustion engine 10. Water evaporated from lubricating oil may be discharged to the outside through such a ventilation passage.

The overall configuration of the vehicle 90 is not limited to the example of the above embodiment. For example, the automatic transmission of the vehicle 90 may include a continuously variable automatic transmission. In this case, the content of the normal map, the low-load map, and the high-load map may be changed in accordance with the continuously variable automatic transmission. In the same manner as the stepped automatic transmission, the low-load map only needs to be created so that the gear ratio set in the automatic transmission can be increased compared to when the normal process is performed under the same condition. The high-load map only needs to be created from the same viewpoint as in the above embodiment.

The vehicle may include two motor generators in addition to the internal combustion engine as the drive source. In such a configuration, the content of basic control of the power transmission system in the vehicle performed through the normal process, the specific process, and the increasing process may be changed in correspondence with the configuration of the vehicle. When the internal combustion engine and the two motor generators are provided as the drive source of the vehicle, for example, the internal combustion engine and the two motor generators may be connected to each other using a planetary gear mechanism. The planetary gear mechanism includes a sun gear as an external gear, a ring gear as an internal gear, pinion gears located between the sun gear and the ring gear, and a carrier supporting the pinion gears. The sun gear, the ring gear, and the carrier are coaxially rotatable. A crankshaft of the internal combustion engine is coupled to the carrier. A first motor generator, which is one of the two motor generators, is coupled to the sun gear. A second motor generator, which is the other one of the two motor generators, is coupled to the internal combustion engine and the first motor generator by the ring gear. The first motor generator functions as a starter motor of the internal combustion engine. In other words, the first motor generator can apply torque to the crankshaft. The second motor generator functions as a motor for traveling. That is, the second motor generator can apply torque to the driven wheels.

In this configuration, for example, an assist torque for traveling produced by the second motor generator may be larger in the specific process than in the normal process. In this case, the engine torque TE used to obtain the same requested drive force is reduced. Conversely, an assist torque for traveling produced by the second motor generator may be larger in the increasing process than in the normal process. In this case, the engine torque TE used to obtain the same requested drive force is increased. Such a specific process or increasing process may be performed. The specific process and the increasing process only need to be performed as necessary by determining whether the processes need to be executed with reference to the determination value PA and the specified temperature LA, which have been described in the above embodiment. The torque application device that transmits and receives torque to and from the crankshaft of the internal combustion engine includes a device (e.g., second motor generator) that can change the engine torque TE in correspondence with a change in its control content. In the specific process, torque may be applied to the crankshaft from the first motor generator.

Figure 8:
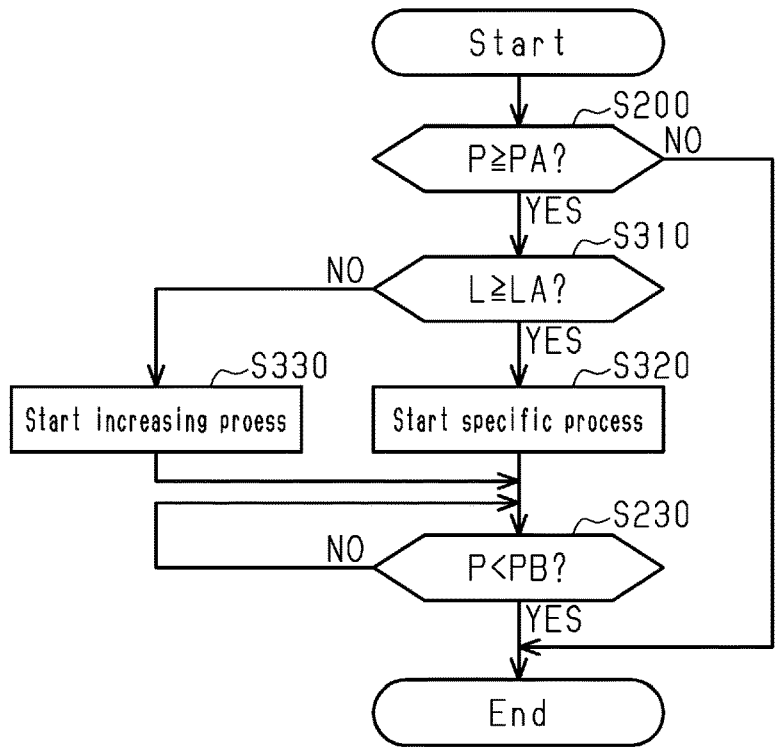
FIG. 8 is a flowchart illustrating a modified example of the coping process.

The vehicle may include only the internal combustion engine as the drive source and does not have to include the motor generator. Even in such a vehicle, if the vehicle includes a torque application device (e.g., an automatic transmission) capable of transmitting and receiving torque to and from the internal combustion engine, the specific process or the increasing process can be performed when the diluted water amount P increases. For example, there is a vehicle having only an internal combustion engine as a drive source and having a stepped automatic transmission coupled to the internal combustion engine. In this vehicle, a controller controls the internal combustion engine and the automatic transmission through the normal process, the specific process, and the increasing process in the same manner as the above embodiment. Basically, the controller performs the normal process so that the vehicle travels in the same manner as the above embodiment. For example, the coping process shown in FIG. 8 may be performed for such a vehicle. In FIG. 8, the same step numbers as those in the above embodiment are given to sections in which the same processes as those in the above embodiment are performed.

The controller starts the coping process on condition that the vehicle is driven by the normal process. After starting the coping process, the controller first executes the process of step S200. When the current diluted water amount P is less than the determination value PA in step S200, the controller ends the series of processes of the coping process. When the current diluted water amount P is greater than or equal to the determination value PA, the controller advances the process to step S310. When the current temperature L of lubricant oil is greater than or equal to the specified temperature LA (step S310: YES), the controller starts the specific process (step S320). That is, the controller controls the automatic transmission 85 using the low-load map as the shift map. When the current temperature L of the lubricant oil is lower than the specified temperature LA (step S310: NO), the controller starts the increasing process (step S330). That is, the controller controls the automatic transmission using the high-load map as the shift map. Thereafter, the controller continues the specific process or the increasing process until the diluted water amount P becomes less than the end value PB. When the diluted water amount P becomes less than the end value PB (step S230: YES), the controller ends the water amount reduction process that is currently being executed and ends the coping process. The diluted water amount P may be reduced by the coping process as described above. Such an aspect reduces the diluted water amount, while maintaining the requested drive force and thus the output required for the internal combustion engine. In the case of a vehicle having only an internal combustion engine as the drive source of the vehicle, the state of charge SOC of the battery 79 and thus the target motor torque may be omitted from the specified parameters.

In a case in which the vehicle includes two motor generators as the drive source or the vehicle includes only the internal combustion engine as the drive source as in the above modification, the diluted water amount P may be reduced only by performing the specific process without performing the increasing process.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a vehicle, the vehicle including an internal combustion engine and an automatic transmission that receives torque from an output shaft of the internal combustion engine, the controller comprising:
processing circuitry,
wherein during operation of the internal combustion engine, the processing circuitry is configured to execute:
a water amount calculation process that calculates a diluted water amount based on an operation state of the internal combustion engine, the diluted water amount being an amount of water contained in lubricating oil in the internal combustion engine; and
a specific process that controls the automatic transmission such that torque per unit period in the internal combustion engine becomes smaller when the diluted water amount is greater than or equal to a determination value compared to when the diluted water amount is less than the determination value, while continuing the operation of the internal combustion engine, and
wherein the processing circuitry is configured to make a gear ratio of the automatic transmission larger in the specific process when the diluted water amount is greater than or equal to the determination value compared to when the diluted water amount is less than the determination value.

2. A controller for a vehicle, the vehicle including an internal combustion engine and a motor generator capable of applying torque to an output shaft of the internal combustion engine, the controller comprising:
processing circuitry,
wherein during operation of the internal combustion engine, the processing circuitry is configured to execute:
a water amount calculation process that calculates a diluted water amount based on an operation state of the internal combustion engine, the diluted water amount being an amount of water contained in lubricating oil in the internal combustion engine; and
a specific process that controls the motor generator such that torque per unit period in the internal combustion engine becomes smaller when the diluted water amount is greater than or equal to a determination value compared to when the diluted water amount is less than the determination value, while continuing the operation of the internal combustion engine,
wherein the processing circuitry is configured to make the torque applied to the output shaft of the internal combustion engine from the motor generator larger in the specific process when the diluted water amount is greater than or equal to the determination value compared to when the diluted water amount is less than the determination value.

3. The controller according to claim 1, wherein
the processing circuitry is further configured to execute, during the operation of the internal combustion engine, an oil temperature calculation process that calculates a temperature of the lubricating oil in the internal combustion engine based on the operation state of the internal combustion engine, and
the processing circuitry is configured to execute the specific process when the temperature of the lubricating oil is greater than or equal to a specified temperature defined in advance.

4. The controller according to claim 3, wherein
the processing circuitry is further configured to execute an increasing process that controls the automatic transmission such that the torque per unit period of the internal combustion engine becomes larger when the diluted water amount is greater than or equal to the determination value compared to when the diluted water amount is less than the determination value, while continuing the operation of the internal combustion engine, and
the processing circuitry is configured to execute the increasing process, instead of executing the specific process, when the temperature of the lubricating oil is lower than the specified temperature.

5. The controller according to claim 4, wherein
the vehicle further includes:
a motor generator capable of applying torque to a driven wheel of the vehicle; and
a battery that supplies electric power to the motor generator,
the processing circuitry is configured to switch a target state of charge of the battery between a first set value and a second set value larger than the first set value, based on an estimated water amount that is an estimated value of the diluted water amount obtained after a predetermined period from the current point in time.

6. The controller according to claim 5, wherein
the processing circuitry is configured to set the target state of charge to the first set value when the estimated water amount is less than the determination value and set the target state of charge to the second set value when the estimated water amount is greater than or equal to the determination value.

7. The controller according to claim 6, wherein the processing circuitry is configured to perform the specific process on condition that three requirements are satisfied, and the three requirements are: the diluted water amount is greater than or equal to the determination value; the state of charge of the battery is less than the second set value; and the temperature of lubricant oil is greater than or equal to the specified temperature.

8. The controller according to claim 7, wherein
the specified temperature is a temperature at which an evaporation amount of water from the lubricating oil starts to increase rapidly.

9. The controller according to claim 7, wherein
the specified temperature is 70° C.

10. The controller according to claim 1, wherein
the vehicle further includes:
a motor generator capable of applying torque to a driven wheel of the vehicle; and
a battery that supplies electric power to the motor generator,
a set value is set to a minimum value of a state of charge of the battery required for the vehicle to travel a specified distance defined in advance only by the torque of the motor generator, and
the processing circuitry is further configured to execute an electric traveling process that causes the vehicle to travel using only the torque of the motor generator, instead of executing the specific process, when the state of charge of the battery is greater than or equal to the set value that has been defined in advance.

11. A control method for a vehicle, the vehicle including an internal combustion engine and an automatic transmission that receives torque from an output shaft of the internal combustion engine, the control method comprising:
executing, during operation of the internal combustion engine, a water amount calculation process that calculates a diluted water amount based on an operation state of the internal combustion engine, the diluted water amount being an amount of water contained in lubricating oil in the internal combustion engine; and
executing, during operation of the internal combustion engine, a specific process that controls the automatic transmission such that torque per unit period in the internal combustion engine becomes smaller when the diluted water amount is greater than or equal to a determination value compared to when the diluted water amount is less than the determination value, while continuing the operation of the internal combustion engine, and making a gear ratio of the automatic transmission larger when the diluted water amount is greater than or equal to the determination value compared to when the diluted water amount is less than the determination value.

* * * * *